(12) United States Patent
Aitken et al.

(10) Patent No.: US 9,981,870 B2
(45) Date of Patent: May 29, 2018

(54) NON-STOICHIOMETRIC ALKALINE EARTH CHALCOGENO-GERMANATE GLASSES

(71) Applicant: Corning Incorporated, Corning, NY (US)

(72) Inventors: Bruce Gardiner Aitken, Corning, NY (US); Stephen Charles Currie, Corning, NY (US)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 15/034,758

(22) PCT Filed: Nov. 6, 2014

(86) PCT No.: PCT/US2014/064222
§ 371 (c)(1),
(2) Date: May 5, 2016

(87) PCT Pub. No.: WO2015/073282
PCT Pub. Date: May 21, 2015

(65) Prior Publication Data
US 2016/0280587 A1 Sep. 29, 2016

Related U.S. Application Data

(60) Provisional application No. 61/905,392, filed on Nov. 18, 2013.

(51) Int. Cl.
*C03C 3/32* (2006.01)
*C03B 1/00* (2006.01)
*C03C 4/10* (2006.01)
*C03C 4/12* (2006.01)

(52) U.S. Cl.
CPC ............... *C03C 3/321* (2013.01); *C03C 4/10* (2013.01); *C03C 4/12* (2013.01); *C03B 1/00* (2013.01)

(58) Field of Classification Search
CPC .. C03C 3/32; C03C 3/321; C03C 4/10; C03C 4/12
See application file for complete search history.

(56) References Cited

U.S. PATENT DOCUMENTS

| 3,214,241 | A | * | 10/1965 | Forber | ............ C03C 3/321 501/40 |
|---|---|---|---|---|---|
| 5,389,584 | A | | 2/1995 | Aitken et al. | |
| 5,392,376 | A | | 2/1995 | Aitken et al. | |
| 5,629,248 | A | | 5/1997 | Aggarwal et al. | |
| 5,846,889 | A | | 12/1998 | Harbison et al. | |
| RE36,513 | E | | 1/2000 | Aitken et al. | |
| 8,541,324 | B2 | * | 9/2013 | Aitken | ............ C03C 3/321 501/37 |
| 9,475,725 | B2 | * | 10/2016 | Aitken | ............ C03C 3/321 |
| 2016/0289115 | A1 | * | 10/2016 | Aitken | ............ C03C 3/321 |

FOREIGN PATENT DOCUMENTS

FR 2223319 A1 10/1974

OTHER PUBLICATIONS

Mao et al. "Synthesis and physical properties of chalcogenide glasses in the system BaSe—Ga2Se3—GeSe2." J. Non-Cryst. Solids 369 (2013) 38.
Mei et al., Preparation and Characterization of Glasses in the Ag2S+B2S3+GeS2 System, 324 J. Non-Cryst. Solids 264-76 (2003).
International Search Report and the Written Opinion of the International Searching Authority, dated Apr. 22, 2016, 5 Pages, EPO.
Nemec P et al: "Structure and Properties of the Pure and PR<3+>- Doped Ge25Ga5Se70 and Ge30Ga5Se65 Glasses", Journal of Non-Crystalline Solids, North-Holland Physics Publishing. Amsterdam, NL, vol. 270, No. 1-3, May 1, 2000 (May 1, 2000), pp. 137-146, XP004198602, ISSN:0022-3096, DOI: 10.1016/S0022-3093(00)00066-1.
S Asokan et al: Physical Review Letters Feb. 13, 1989 Mechanical and Chemical Thresholds in IV-VI Chalcogenide Glasses:, Feb. 13, 1989 (Feb. 13, 1989), XP055181601, Retrieved From the Internet: URL:http://journals.aps.org/prl/pdf/10-1103.PHYSREVLETT.62. 808 [Retrieved on Apr. 8, 2015].

* cited by examiner

*Primary Examiner* — Elizabeth A. Bolden
(74) *Attorney, Agent, or Firm* — Dinsmore & Shohl LLP

(57) ABSTRACT

A non-stoichiometric glass composition having greater than or equal to about 50 mol. % to less than or equal to about 95 mol. % $GeX_2$; greater than or equal to about 0.5 mol. % to less than or equal to about 35 mol. % $Ga_2X_3$, $In_2X_3$, or a combination thereof; and greater than or equal to about 0.5 mol. % to less than or equal to about 40 mol. % RX. R can be an alkaline earth metal. X can be present in a non-stoichiometric amount and can be selected from Se, Te, S, and combinations thereof. A method for making a non-stoichiometric glass including forming a GaGeX precursor material, grinding the precursor material, loading the ground precursor material with an alkaline earth metal component, and forming an alkaline earth metal GaGeX glass.

19 Claims, No Drawings

NON-STOICHIOMETRIC ALKALINE EARTH CHALCOGENO-GERMANATE GLASSES

CROSS-REFERENCE TO RELATED APPLICATIONS

This application claims the benefit of priority under 35 U.S.C. § 119 of U.S. Provisional Application Ser. No. 61/905,392 filed on Nov. 18, 2013, the content of which is relied upon and incorporated herein by reference in its entirety.

BACKGROUND

Field

The present specification generally relates to alkaline earth chalcogeno-germanate glasses and, more specifically, to alkaline earth chalcogeno-germanate glasses that are non-stochiometric in nature.

Technical Background

U.S. Pat. No. 8,541,324 discloses pergallous alkaline earth selenogermanate glasses. However, the pergallous alkaline earth selenogermanate glasses disclosed therein can be difficult to form and, therefore, various properties of the disclosed pergallous alkaline earth selenogermanate glasses, such as, for example, the glass transition temperature and the onset of crystallization temperature, can be limited.

Accordingly, alternative alkaline earth selenogermanate glasses having improved formability and customizable properties can be desired.

SUMMARY

According to one embodiment, a non-stoichiometric glass composition comprises: greater than or equal to about 50 mol. % to less than or equal to about 95 mol. % $GeX_2$; greater than or equal to about 0.5 mol. % to less than or equal to about 35 mol. % $Ga_2X_3$, $In_2X_3$, or a combination thereof; and greater than or equal to about 0.5 mol. % to less than or equal to about 40 mol. % RX. R can be an alkaline earth metal; and X can be present in a non-stoichiometric amount and can be selected from the group consisting of Se, Te, S, and combinations thereof.

In another embodiment, a method for making a non-stoichiometric glass comprises: forming a GaGeX precursor material; grinding the precursor material; loading the ground precursor material with an alkaline earth metal component; forming an alkaline earth metal GaGeX glass. The glass comprises: greater than or equal to about 50 mol. % to less than or equal to about 95 mol. % $GeX_2$; greater than or equal to about 0.5 mol. % to less than or equal to about 35 mol. % $Ga_2X_3$, $In_2X_3$, or a combination thereof; and greater than or equal to about 0.5 mol. % to less than or equal to about 40 mol. % RX. R can be an alkaline earth metal, and X can be selected from the group consisting of Se, Te, S, and combinations thereof and is present in a non-stoichiometric amount.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of non-stoichiometric glass compositions comprising: one or more germanium-chalcogen components; one or more gallium-chalcogen components and/or one or more indium-chalcogen components; and one or more alkaline earth-chalcogen components. In one embodiment a non-stoichiometric glass comprises $GeX_2$, $Ga_2X_3$ and/or $In_2X_3$, and RX, where R is an alkaline earth metal and X is a chalcogen present in a non-stoichiometric amount. Various embodiments of non-stoichiometric alkaline earth chalcogeno-germanate glasses and methods for forming the same will be described in further detail herein.

Germanium-chalcogen and gallium-chalcogen components can be used to affect the optical properties of the glass. Germanium-chalcogen components generally have a high index of refraction. Thus, these components can be useful for various applications, such as, for example, wide-angle camera lenses, microscopy, and optical fibers.

Germanium-chalcogen and gallium-chalcogen components are also transparent in the infrared spectrum and, thus, they are very useful infrared optical materials. For example, germanium-chalcogen containing glasses can be readily cut and polished into lenses, windows, and fibers to be used as infrared transmitters. Accordingly, germanium-chalcogen components can be used in infrared spectroscopes and other optical equipment which require extremely sensitive infrared detectors. Germanium-chalcogen components can also be used to impart various other properties to glass compositions.

The chalcogen in the germanium-chalcogen component can be any suitable chalcogen, such as, for example, Se, Te, S, and combinations thereof. In some embodiments, the chalcogen in the germanium-chalcogen component is Se. In other embodiments, the chalcogen in the germanium-chalcogen component is at least 50% Se and further comprises Te, S, and/or combinations thereof. In yet other embodiments, the chalcogen in the germanium-chalcogen component is at least 60% Se and further comprises Te, S, and/or combinations thereof. In still other embodiments, the chalcogen in the germanium-chalcogen component is at least 70% Se and further comprises Te, S, and/or combinations thereof.

In embodiments, the glass composition can comprise from greater than or equal to about 50 mol. % to less than or equal to about 95 mol. % of the germanium-chalcogen component, such as from greater than or equal to about 55 mol. % to less than or equal to about 85 mol. % of the germanium-chalcogen component. In other embodiments, the glass composition can comprise from greater than or equal to about 60 mol. % to less than or equal to about 80 mol. % of the germanium-chalcogen component, such as from greater than or equal to about 65 mol. % to less than or equal to about 75 mol. % of the germanium-chalcogen component. In yet other embodiments, the glass composition can comprise from greater than or equal to about 60 mol. % to less than or equal to about 70 mol. % of the germanium-chalcogen component.

The gallium-chalcogen component and/or the indium-chalcogen component can be used as network former. In some embodiments, the glass composition comprises gallium-chalcogen components. In other embodiments, the glass composition comprises indium-chalcogen components. In yet other embodiments, the glass composition comprises both gallium-chalcogen components and indium-chalcogen components.

The chalcogen in the gallium-chalcogen component and/or the indium-chalcogen component can be any suitable chalcogen, such as, for example, Se, Te, S, and combinations thereof. In some embodiments, the chalcogen in the gallium-chalcogen component and/or the indium-chalcogen component is Se. In other embodiments, the chalcogen in the gallium-chalcogen component and/or the indium-chalcogen component is at least 50% Se and further comprises Te, S, and/or combinations thereof. In yet other embodiments, the chalcogen in the gallium-chalcogen component and/or the indium-chalcogen component is at least 60% Se and further comprises Te, S, and/or combinations thereof. In still other embodiments, the chalcogen in the gallium-chalcogen component and/or the indium-chalcogen component is at least 70% Se and further comprises Te, S, and/or combinations thereof.

In embodiments, the glass composition can comprise from greater than or equal to about 0.5 mol. % to less than or equal to about 35 mol. % of the gallium-chalcogen component and/or the indium-chalcogen component, such as from greater than or equal to about 1.0 mol. % to less than or equal to about 25 mol. %. In other embodiments, the glass composition can comprise from greater than or equal to about 2.0 mol. % to less than or equal to about 20 mol. % of the gallium-chalcogen component and/or the indium-chalcogen component, such as from greater than or equal to about 4.0 mol. % to less than or equal to about 15 mol. %. In yet other embodiments, the glass composition can comprise from greater than or equal to about 5.0 mol. % to less than or equal to about 7.5 mol. % of the gallium-chalcogen component and/or the indium-chalcogen component.

Alkaline earth-chalcogen components can have a high transmittance in the infrared spectrum and, thus, may not negatively impact the infrared transmittance when added to the glass composition. Alkaline earths also modify the glass transition temperature ($T_g$), and the temperature of the onset of crystallization ($T_x$) so as to increase the "forming window" or difference between $T_x$ and $T_g$, which is discussed in more detail below. Moreover, in embodiments, a higher alkaline earth content can allow for the fabrication of glasses with a greater departure from stoichiometry.

The alkaline earth metal in the alkaline earth-chalcogen component can be any suitable alkaline earth metal and can be a mixture of two or more alkaline earth-chalcogen components. In embodiments, the alkaline earth metal in the alkaline earth-chalcogen component can be selected from Ba, Sr, Ca, and combinations thereof. In some embodiments, the alkaline earth metal in the alkaline earth-chalcogen component is Ba. In other embodiments the alkaline earth metal in the alkaline earth-chalcogen component is Ba and one or more of Sr and/or Ca.

The chalcogen in the alkaline earth-chalcogen component can be any suitable chalcogen, such as, for example, Se, Te, S, and combinations thereof. In some embodiments, the chalcogen in the alkaline earth-chalcogen component is Se. In other embodiments, the chalcogen in the alkaline earth-chalcogen component is at least 50% Se and further comprises Te, S, and/or combinations thereof. In yet other embodiments, the chalcogen in the alkaline earth-chalcogen component is at least 60% Se and further comprises Te, S, and/or combinations thereof. In still other embodiments, the chalcogen in the alkaline earth-chalcogen component is at least 70% Se and further comprises Te, S, and/or combinations thereof.

In embodiments, the glass composition can comprise from greater than or equal to about 0.5 mol. % to less than or equal to about 40 mol. % of the alkaline earth-chalcogen component, such as from greater than or equal to about 1.0 mol. % to less than or equal to about 32.5 mol. %. In other embodiments, the glass composition can comprise from greater than or equal to about 2.0 mol. % to less than or equal to about 30 mol. % of the gallium-chalcogen component and/or the indium-chalcogen component, such as from greater than or equal to about 4.0 mol. % to less than or equal to about 25 mol. %. In yet other embodiments, the glass composition can comprise from greater than or equal to about 5.0 mol. % to less than or equal to about 20 mol. % of the gallium-chalcogen component and/or the indium-chalcogen component.

Embodiments of the glass composition can contain dopants comprising one or more optically active rare earth elements. In embodiments, the rare earth elements can be selected from Y, La, Ce, Pr, Nd, Sm, Eu, Gd, Tb, Dy, Ho, Er, Tm, Yb, Lu, and mixtures thereof.

In embodiments, the glass composition can comprise from greater than or equal to 0.0 mol. % to less than or equal to about 10 mol. % of the rare earth dopants, such as from greater than or equal to about 1.0 mol. % to less than or equal to about 9.0 mol. %. In other embodiments, the glass composition can comprise from greater than or equal to about 2.0 mol. % to less than or equal to about 8.0 mol. % of the rare earth dopants, such as from greater than or equal to about 3.0 mol. % to less than or equal to about 7.0 mol. %. In yet other embodiments, the glass composition can comprise from greater than or equal to about 4.0 mol. % to less than or equal to about 5.0 mol. % of the rare earth dopants, such as from greater than or equal to about 5.0 mol. % to less than or equal to about 6.0 mol. %.

It should be understood that any of the above germanium-chalcogen components, gallium-chalcogen and/or indium-chalcogen components, alkaline earth-chalcogen components, and, optionally, rare earth dopants, can be used in various amounts and various combinations in accordance with embodiments. However, in some embodiments, the glass composition comprises gallium selenide ($Ga_2Se_3$) and barium selenide (BaSe).

According to embodiments, the chalcogen in the overall glass composition can be present in a non-stoichiometric amount. In some embodiments, the glass composition can have a stoichiometric excess of chalcogen. In other embodiments, the glass composition can have a stoichiometric deficiency of chalcogen. For example, in a glass comprising gallium selenide, germanium selenide, and barium selenide, the stoichiometric amount of each component is $Ga_2Se_3$, $GeSe_2$, and BaSe. Put differently, in this example, the stoichiometric amount of Se is 1.5 Se/Ga, 2 Se/Ge, and 1 Se/Ba. Thus, to calculate a stoichiometric amount of Se, one would multiply the amount of Ga by 1.5, the amount of Ge by 2, and the amount of Ba by 1 and sum the products. The sum of these products could then be adjusted to determine the stoichiometric excess or deficiency. For example, if the stoichiometric amount of Se is 60.0 a 20% stoichiometric excess of Se would be 72.0 Se (60.0×1.2) and a 20% stoichiometric deficiency of Se would be 48.0 Se (60.0×0.8). Having calculated this new stoichiometric excess or deficiency, the normalized amount of Ga, Ge, and Ba can then be calculated. For example, a compositing having the following components in atomic percent 6.90Ba; 3.45Ga; 25.86Ge; and 63.79Se, an 80% stoichiometric amount of Se would be 51.03 (63.79×0.8). The new sum for the non-stoichiometric atomic percent in this example is then 6.90Ba+3.45Ga+25.86Ge+51.03Se=87.24. To normalize these numbers, each atomic percent is multiplied by the factor 100/87.24=1.146. Thus, the atomic percent of each component in an 80% non-stoichiometric batch would be 7.91Ba (6.9×1.146), 3.95Ga (3.45×1.146), 29.64Ge (25.86× 1.146), and 58.48Se (51.03×1.146).

The stoichiometric excess and stoichiometric deficiency can also be conveyed as a percentage of the stoichiometric amount. Using the above example, 60.0 Se would be a stoichiometric percentage of 100%, 48.0 Se would be a stoichiometric percentage of 80%, and 72 Se would be a stoichiometric percentage of 120%. In embodiments, the stoichiometric percentage of the chalcogen can be from greater than or equal to about 55% (e.g., a 45% stoichiometric deficiency) to less than 100%, or even from greater than or equal to about 60% (e.g., a 40% stoichiometric deficiency) to less than or equal to about 95% (e.g., a 5% stoichiometric deficiency). In other embodiments, the stoichiometric percentage of the chalcogen can be from greater than or equal to about 65% (e.g., a 35% stoichiometric deficiency) to less than or equal to about 90% (e.g., a 10% stoichiometric deficiency), or even from greater than or equal to about 70% (e.g., a 30% stoichiometric deficiency) to less than or equal to about 85% (e.g., a 15% stoichiometric deficiency). In embodiments, the stoichiometric percentage of the chalcogen can be from greater than 100% to less than or equal to about 125% (e.g., a 25% stoichiometric excess), or even from greater than or equal to about 105% (e.g., a 5% stoichiometric excess) to less than or equal to about 120% (e.g., a 20% stoichiometric excess). In other embodiments, the stoichiometric percentage of the chalcogen can be from greater than or equal to about 110% (e.g., a 10% stoichiometric excess) to less than or equal to about 115% (e.g., a 15% stoichiometric excess).

Non-stoichiometric glass compositions described herein were not previously considered because the thought in the art was that, due to their more ionic character than that of conventional network chalcogenide glasses (i.e., glasses comprising only chalcogens and the typical network-forming chalcophile metals such as Ge, Ga, As, In, Sn, Sb among others), departure from stoichiometry would make them unstable. However, unexpectedly, many non-stoichiometric alkaline earth chalcogeno-germanate glass compositions were found to not only be stable, but to provide improved formability and properties of the glass. For example, non-stoichiometric alkaline earth chalcogeno-germanate glass compositions according to embodiments can have an expanded glass forming region when compared to similar stoichiometric glass compositions. This expanded glass forming region allows flexibility to tailor glass properties, such as, for example, glass transition temperature ($T_g$), coefficient of thermal expansion (CTE), and refractive index. In embodiments, the non-stoichiometric alkaline earth chalcogeno-germanate glasses can have a greater glass stability window as measured by the temperature difference between the temperature of the onset of crystallization ($T_x$) and the glass transition temperature, which can allow the glass compositions to be used in difficult glassworking processes, such as, for example, fiber drawing.

In embodiments, the $T_g$ of the glass composition can be from greater than or equal to about 300° C. to less than or equal to about 400° C., such as from greater than or equal to about 310° C. to less than or equal to about 390° C. In other embodiments, the $T_g$ of the glass composition can be from greater than or equal to about 320° C. to less than or equal to about 380° C., such as from greater than or equal to about 330° C. to less than or equal to about 370° C. In yet other embodiments, the $T_g$ of the glass composition can be from greater than or equal to about 340° C. to less than or equal to about 360° C., such about 350° C.

In embodiments, the $T_x$ of the glass composition can be from greater than or equal to about 400° C. to less than or equal to about 500° C., such as from greater than or equal to about 410° C. to less than or equal to about 490° C. In other embodiments, the $T_x$ of the glass composition can be from greater than or equal to about 420° C. to less than or equal to about 480° C., such as from greater than or equal to about 430° C. to less than or equal to about 470° C. In yet other embodiments, the $T_x$ of the glass composition can be from greater than or equal to about 440° C. to less than or equal to about 460° C., such about 450° C.

In embodiments, the difference between the $T_x$ and the $T_g$ of the glass composition can be from greater than or equal to about 70° C. to less than or equal to about 150° C., such as from greater than or equal to about 80° C. to less than or equal to about 140° C. In other embodiments, the difference between the $T_x$ and the $T_g$ of the glass composition can be from greater than or equal to about 90° C. to less than or equal to about 130° C., such as from greater than or equal to about 100° C. to less than or equal to about 120° C.

The glass compositions disclosed hereinabove can be formed by any suitable method. In embodiments, all batch materials can be loaded into a fused silica ampoule. This operation can be carried out inside a glovebox, which can have an inert atmosphere. The ampoule can be evacuated, sealed, and heated in a rocking furnace at a temperature and for a time sufficient to melt the batch. The ampoule can then be cooled to quenched the melt into a glass. The batch materials can be Ba (and/or Sr, Ca), Ga, Ge and Se (and/or S, Te). However, the batch materials can also be any chalcogenide compound of Ba (Sr, Ca), Ga and Ge such as BaSe (SrSe, CaSe), Ga2Se3, GaSe, GeSe2, GeSe, or the analogous sulfides and/or tellurides. In embodiments, the batch materials are not halides nor chalcohalides.

In embodiments, the glass composition can be formed as described above, but wherein the fused silica ampoule is coated on the inside. The coating can prevent the alkaline earth metal or chalcogenide from reacting with the ampoule wall, which would thereby incorporate O into the glass. The coating material can be silicon, carbon, or any other material that will prevent oxidation of the alkaline earth.

In embodiments, the glass composition can be formed using a two-step method. In the first step, all batch materials except the alkaline earth metal or alkaline earth chalcogenide can be melted using the above process to form an alkaline earth-free precursor material which can be glassy, or partially to fully crystallized. The latter can then be ground, mixed with the alkaline earth metal or alkaline earth chalcogenide, and loaded into a coated ampoule, which can then be heated in a rocking furnace as described above. This process can accelerate the melting kinetics so that a prolonged heating time does not result in erosion of the ampoule's inner coating and, therefore, potentially oxidize the melt and resultant glass.

In some embodiments, the two-step method can be as follows, the desired amounts of Ga and/or In, Ge, and chalcogen are mixed into a precursor batch. It should be understood that the Ga and/or In, Ge, and chalcogen can be added to the precursor batch in the form of elements, halide salts, chalcogenides, chalcohalides, and mixtures thereof. The precursor batch can then be melted and/or formed using the melting process described above. For example, the precursor batch can be loaded into one or more ampoules and heated to a temperature that causes the precursor batch to melt. According to some embodiments, the melted precursor material can then be quenched in water. It should be understood that the precursor material can be crystalline, non-crystalline, or partially crystallized.

After the precursor material is quenched, or otherwise solidifies, according to embodiments, the precursor material is ground and loaded into one or more ampoules with an alkaline earth metal component. It should be understood that the alkaline earth metal component can comprise alkaline earth metals as elements or as components, such as, for example, halide salts, chalcogenides, chalcohalides, and mixtures thereof. The mixture of the precursor material and the alkaline earth metal component can then be melted at a temperature that causes the mixture to melt. In some embodiments, the precursor material and the alkaline earth metal component are loaded into a vitreous carbon (C) crucible to be melted.

In embodiments, the mixture of the precursor material and the alkaline earth metal component can be heated in a vertical furnace having two or more heating zones. One heating zone is operated such that it heats the crucible to a certain, predetermined temperature (hereinafter referred to as the "central temperature"). In embodiments, another heating zone in the vertical furnace above the crucible is operated to heat the crucible to a temperature that is greater than the central temperature, In embodiments, this heating zone is at least 50° C. higher than the central temperature, such as at least 60° C. higher than the central temperature. In other embodiments, the heating zone above the crucible is heated to a temperature that is at least 70° C. higher than the central temperature, such as at least 75° C. higher than the central temperature. This temperature differential suppresses the volatilization of Ge and the chalcogen.

The central temperature can be any suitable temperature that is high enough to cause the mixture of the precursor material and the alkaline earth metal component to melt and does not adversely affect the mixture. In embodiments, the central temperature can be from greater than or equal to about 850° C. to less than or equal to about 950° C., such as form greater than or equal to about 860° C. to less than or equal to about 940° C. In other embodiments, the central temperature can be from greater than or equal to about 870° C. to less than or equal to about 930° C., such as form greater than or equal to about 880° C. to less than or equal to about 920° C. In yet other embodiments, the central temperature can be from greater than or equal to about 890° C. to less than or equal to about 910° C., or equal to about 900° C. After the precursor material and the alkaline earth metal component have been melted, the mixture can be quenched, or otherwise solidified to form a glass. In embodiments, before the glass is solidified, it can be formed into a predetermined form, such as a sheet, a lens, or drawn into a fiber. Any suitable method can be used to form the glass into its desired shape.

EXAMPLES

Embodiments will be further clarified by the following examples.

Glasses according to embodiments are prepared using a two-step process. In the first step, requisite amounts of Ga, Ge, and Se to obtain glass compositions as listed in Table 1 and Table 2 below are formed into a GaGeSe glass by loading the elements into fused silica ampoules in a nitrogen-filled glovebox. The ampoules are evacuated to about $10^{-5}$ Torr, flame sealed, and then heated to about 950° C. in a rocking furnace. Finally, the samples are quenched in water to convert the precursor material melt into a GaGeSe glass.

In the second step, the GaGeSe precursor material (glass) is ground and then loaded with the requisite amount of Ba metal into a vitreous C crucible that is contained within a fused silica ampoule. The ampoule is evacuated to about $10^{-5}$ Torr and flame sealed. The sealed ampoule is then suspended in a 3-zone vertical furnace so that the crucible is positioned in the central zone. The central zone is operated at about 600° C., with the top zone, which is positioned above the crucible, operating at about 650° C. These conditions are held for about 30 minutes and then the central zone temperature is raised to about 900° C., and the top zone is operated at 950° C. The temperatures of the central zone and the top zone are raised over the course of about 1 hour. The crucible-in-ampoule assembly is held at these conditions for about 3 hours, and then quenched into water to convert the melt into a BaGaGeSe glass.

Table 1, Table 2, and Table 3 below provide compositions (in both mol. % and atomic %) and properties for various glasses made according to the above process. Some of the examples are formed using a coating ampoule. The deviation of Se from the stoichiometric amount is given as a percentage as described in detail above. The glass transition temperature ($T_g$) and the temperature of the onset of crystallization temperature ($T_x$) are measured by differential scanning calorimetry (DSC).

TABLE 1

|  | Ex. 1 | Ex. 2 | Ex. 3 | Ex. 4 | Ex. 5 | Ex. 6 |
| --- | --- | --- | --- | --- | --- | --- |
| Mol. % | | | | | | |
| BaSe | 20 | 20 | 32.5 | 32.5 | 20 | 20 |
| $Ga_2Se_3$ | 5.0 | 5.0 | 7.5 | 7.5 | 5.0 | 5 |
| $GeSe_2$ | 75 | 75 | 60 | 60 | 75 | 75 |
| Stoichiometric Se % | 110 | 120 | 110 | 120 | 90 | 80 |
| Atomic % | | | | | | |
| Ba | 6.48 | 6.12 | 10.83 | 10.24 | 7.37 | 7.91 |
| Ga | 3.24 | 3.06 | 5.0 | 4.72 | 3.68 | 3.95 |
| Ge | 24.31 | 22.94 | 20 | 18.9 | 27.62 | 29.64 |
| Se | 65.96 | 67.89 | 64.17 | 66.14 | 61.33 | 58.5 |
| $T_g$ (° C.) | 376 | 344 | 364 | 328 | 361 | 322 |
| $T_x$ (° C.) | ~450 | | | | 460 | 408 |

TABLE 2

|  | Ex. 7 | Ex. 8 | Ex. 9 | Ex. 10 | Ex. 11 |
| --- | --- | --- | --- | --- | --- |
| Mol. % | | | | | |
| BaSe | 32.5 | 32.5 | 20 | 20 | 32.5 |
| $Ga_2Se_3$ | 7.5 | 7.5 | 5.0 | 5.0 | 7.5 |
| $GeSe_2$ | 60 | 60 | 75 | 75 | 60 |
| Stoichiometric Se % | 90 | 80 | 70 | 60 | 70 |
| Atomic % | | | | | |
| Ba | 12.26 | 13.13 | 8.53 | 9.26 | 14.13 |
| Ga | 5.66 | 6.06 | 4.26 | 4.63 | 6.52 |
| Ge | 22.64 | 24.24 | 31.98 | 34.72 | 26.09 |
| Se | 59.43 | 56.57 | 55.22 | 51.39 | 53.26 |

TABLE 2-continued

|  | Ex. 7 | Ex. 8 | Ex. 9 | Ex. 10 | Ex. 11 |
|---|---|---|---|---|---|
| $T_g$ (° C.) | 373 | 365 | 325 | 324 | 380 |
| $T_x$ (° C.) | 453 | ~500 | 461 | 461 | 467 |

TABLE 3

|  | Ex. 12 | Ex. 13 | Ex. 14 |
|---|---|---|---|
| Mol. % | | | |
| BaSe | 25 | 5 | 5 |
| $Ga_2Se_3$ | 15 | 20 | 20 |
| $GeSe_2$ | 60 | 75 | 75 |
| Stoichiometric Se % | 120 | 120 | 80 |
| Atomic % | | | |
| Ba | 7.29 | 1.32 | 1.71 |
| Ga | 8.75 | 10.58 | 13.70 |
| Ge | 17.49 | 19.84 | 25.69 |
| Se | 66.47 | 68.25 | 58.90 |
| $T_g$ (° C.) | 373 | 305 | 302 |
| $T_x$ (° C.) | 471 | 398 | 369 |

It should now be understood that the glass compositions described herein are alkaline earth chalcogeno-germanate glasses which include chalcogen components in non-stoichiometric amounts. The deviation of the chalcogen components from stoichiometry provides the glasses with unique properties compared to similar glasses having stoichiometric amounts of the same constituent components. For example, the non-stoichiometric glasses described herein unexpectedly have an expanded glass forming region which makes the glasses amenable for use in difficult glassworking processes, such as, for example, fiber drawing, thereby increasing the number of applications in which these glasses can be used.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A non-stoichiometric glass composition comprising:
   greater than or equal to about 50 mol. % to less than or equal to about 95 mol. % $GeX_2$;
   greater than or equal to about 0.5 mol. % to less than or equal to about 35 mol. % $Ga_2X_3$, $In_2X_3$, or a combination thereof; and
   greater than or equal to about 0.5 mol. % to less than or equal to about 40 mol. % RX, wherein:
   R is an alkaline earth metal; and
   X is present in a non-stoichiometric amount and is selected from the group consisting of Se, Te, S, and combinations thereof;
   wherein a content of X is greater than or equal to 55% to less than 100% of a stoichiometric amount or greater than 100% to less than or equal to 125% of a stoichiometric amount.

2. The non-stoichiometric glass composition according to claim 1, wherein the content of X is greater than or equal to 60% to less than 95% of a stoichiometric amount or greater than 105% to less than or equal to 120% of a stoichiometric amount.

3. The non-stoichiometric glass composition according to claim 1, wherein X is Se.

4. The non-stoichiometric glass composition according to claim 1, wherein X comprises at least 50% Se and at least one of S or Te.

5. The non-stoichiometric glass composition according to claim 1, wherein R is Ba.

6. The non-stoichiometric glass composition according to claim 1 comprising more than one alkaline earth metal.

7. The non-stoichiometric glass composition according to claim 1, wherein the alkaline earth metal is selected from the group consisting of Ba, Sr, Ca, and combinations thereof.

8. The non-stoichiometric glass composition according to claim 1, further comprising one or more rare earth dopants.

9. The non-stoichiometric glass composition according to claim 8, wherein the rare earth dopants are present in a concentration from greater than 0 to less than or equal to about 10 mol. %.

10. The non-stoichiometric glass composition according to claim 1, wherein the glass comprises $Ga_2Se_3$ and BaSe.

11. The non-stoichiometric glass composition according to claim 1 comprising:
    greater than or equal to about 60 mol. % $GeX_2$;
    greater than or equal to about 5 mol. % $Ga_2X_3$, $In_2X_3$, or a combination thereof; and
    greater than or equal to about 20 mol. % RX.

12. The non-stoichiometric glass composition according to claim 1 comprising:
    less than or equal to about 75 mol. % $GeX_2$;
    less than or equal to about 20 mol. % $Ga_2X_3$, $In_2X_3$, or a combination thereof; and
    less than or equal to about 32.5 mol. % RX.

13. The non-stoichiometric glass composition according to claim 1 comprising:
    greater than or equal to about 60 mol. % to less than or equal to about 75 mol. % $GeX_2$;
    greater than or equal to about 5.0 mol. % to less than or equal to about 20 mol. % $Ga_2X_3$, $In_2X_3$, or a combination thereof; and
    greater than or equal to about 20 mol. % to less than or equal to about 32.5 mol. % RX.

14. The non-stoichiometric glass composition according to claim 1, wherein a difference between the onset of crystallization temperature ($T_x$) and a glass transition temperature ($T_g$) of the glass composition is from greater than or equal to about 70° C. and less than or equal to about 150° C.

15. The non-stoichiometric glass according to claim 1, wherein the glass is transparent in the infrared spectrum.

16. A method for making a non-stoichiometric glass comprising:
    forming a GaGeX precursor material;
    grinding the precursor material;
    loading the ground precursor material with an alkaline earth metal component;
    forming an alkaline earth metal GaGeX glass, wherein the glass comprises:
    greater than or equal to about 50 mol. % to less than or equal to about 95 mol. % $GeX_2$;
    greater than or equal to about 0.5 mol. % to less than or equal to about 35 mol. % $Ga_2X_3$, $In_2X_3$, or a combination thereof; and greater than or equal to about 0.5 mol. % to less than or equal to about 40 mol. % RX, wherein R is an alkaline earth metal, and X is selected from the group consisting of Se, Te, S, and combinations thereof and is present in a non-stoichiometric amount;

wherein a content of X is greater than or equal to 55% to less than 100% of a stoichiometric amount or greater than 100% to less than or equal to 125% of a stoichiometric amount.

17. The method of claim 16, wherein the alkaline earth metal is selected from the group consisting of Ba, Sr, Ca, and combinations thereof.

18. The method of claim 16, wherein:

the ground GaGeX material is loaded into a vitreous C crucible with the alkaline earth metal; and the mixture is held in a vertical furnace with a central temperature sufficient to melt the GaGeX material, and a temperature above the crucible is at least 50° C. higher than the central temperature.

19. The method of claim 18, wherein the central temperature is from greater than or equal to about 850° C. to less than or equal to about 950° C.

* * * * *